UNITED STATES PATENT OFFICE.

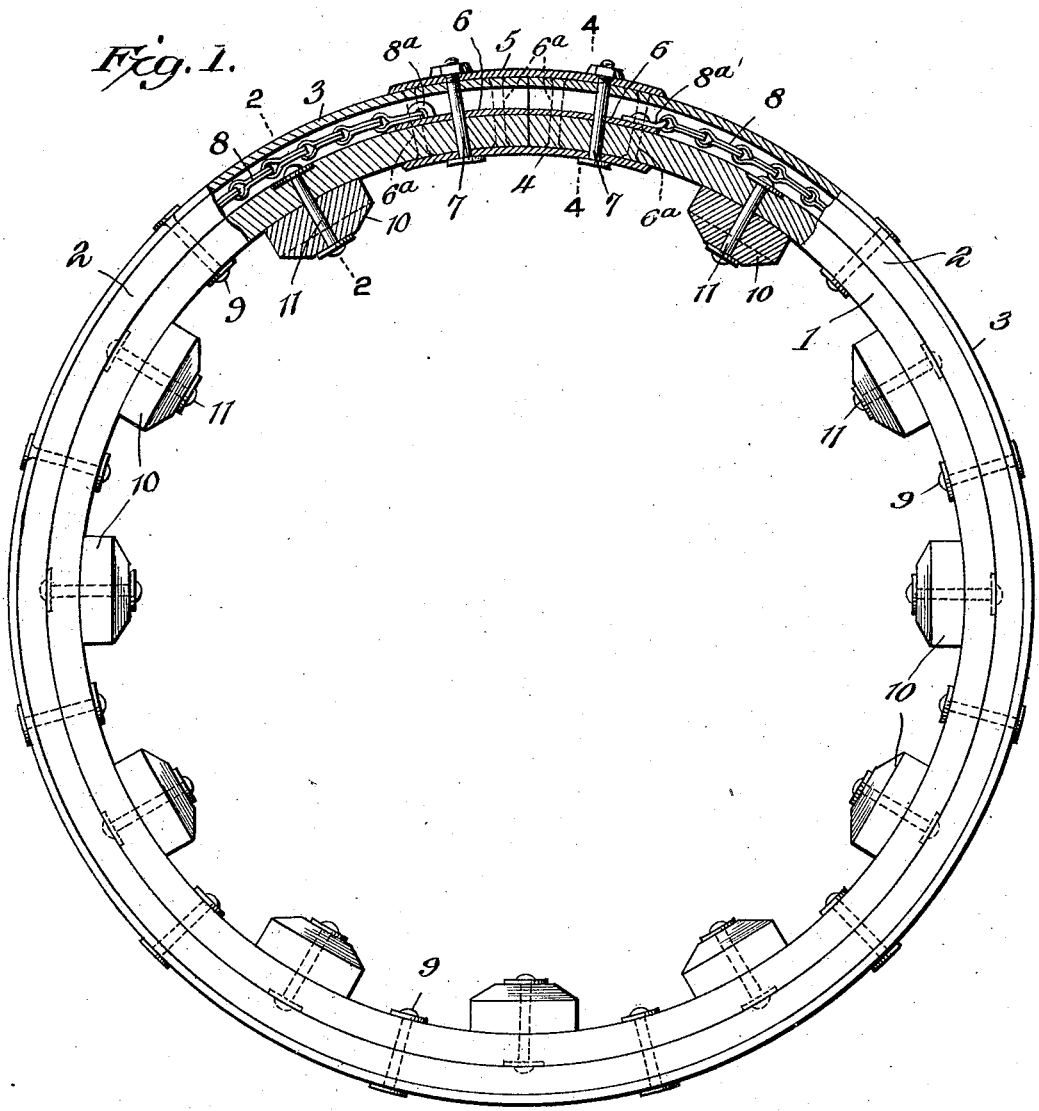
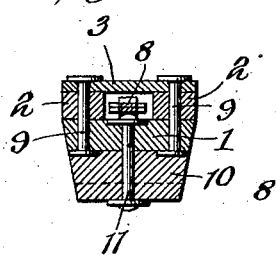
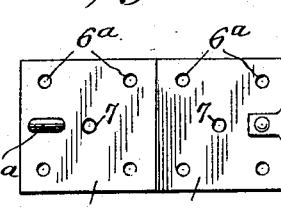
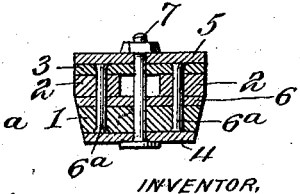

ALBERT HENNIGAN, OF BROOKLYN, NEW YORK.

FAN BELT.

1,414,278.

Specification of Letters Patent.  Patented Apr. 25, 1922.

Application filed June 4, 1921. Serial No. 475,073.

*To all whom it may concern:*

Be it known that I, ALBERT HENNIGAN, a citizen of the United States, residing at Brooklyn, in the county of Kings and State of New York, have invented new and useful Improvements in Fan Belts, of which the following is a specification.

My present invention pertains to fan belts such as are used in connection with the fan of an internal combustion engine and particularly the belt that is used to drive the fan of such engines of tractors or heavy trucks, and it contemplates the provision of a belt that is simple and inexpensive to produce and one that is durable and well able to withstand the rough uses to which such belts are usually subjected.

The invention in all of its details will be fully understood from the following description and claims when the same are read in connection with the drawings accompanying and forming part of this specification, in which:—

Figure 1 is a side elevation of my novel belt and showing a portion thereof in section.

Figure 2 is a view taken on the plane indicated by the line 2—2 in Figure 1.

Figure 3 is a detail view of my novel chain attaching plate.

Figure 4 is a view taken in the plane indicated by the line 4—4 of Figure 1.

Similar numerals of reference designate corresponding parts in all of the views of the drawings.

My novel belt comprises the continuous section 1 of leather or other suitable material and the ends of the section 1 are retained in the proper position by means of the plates 4 and 5 and by reference to Figure 1 particularly it will be noted that the said plates 4 and 5 are secured to each other by means of the bolts 7.

Resting upon the section 1 and extending slightly to the sides of the joint thereof are the plates 6 provided with the hook $8^a$ and eye $8^{a\prime}$. As will be seen by the drawing these plates 6 are provided with apertures that receive the bolts 7 and the bolts $6^a$ which bolts $6^a$ terminate and bear on the plates 4 and 5.

As will be readily seen by reference to Figures 2 and 4 I provide the sections 2 that have a central aperture and above the section 2 I arrange the continuous section 3 and hence it will be apparent that a channel or groove will be formed completely throughout the length of the belt between sections 2 and section 3.

In order to reinforce and prevent breaking of the belt the chain 8 is secured in the channel between sections 2 and section 3 and one end of said chain is secured to the eye $8^{a\prime}$ and the other end is fastened to the hook $8^a$ thereby strengthening in a very material manner the section 1.

In Figure 1 it will be noted that I provide the reinforcing bolts 9 and at equi-distant points throughout the length of the belt I secure to the section 1 the leather portions 10 by means of bolts 11 and these portions 10 are beveled on their outer faces as shown.

In the practical use of my invention, the free ends of the section 1 are placed in abutting position and the plates 6 are arranged over the meeting ends thereof. The chain is then secured to the hook $8^a$ and then the bolts $6^a$ and 7 are properly positioned with the bolts 7 extending through each of the plates 4 and 5. This will produce a continuous belt and irrespective of the strain that is placed on the belt the chain will prevent snapping or breaking thereof. The leather portions 10 will also prevent slipping of the belt about the flywheel shaft and the driving shaft of the motor.

It will be gathered from the foregoing that notwithstanding the terrific strain that is imposed upon the belt as a whole the construction of the retaining plates and the chain are such that breaking of the belt is effectually precluded and if for any reason the belt should break the same may be quickly and easily repaired without the employment of skilled labor.

Having described my invention, what I claim and desire to secure by Letters-Patent is:—

1. In a belt, the combination of a continuous section, a plate arranged on the underside of the meeting end thereof, a plate resting above the meeting ends thereof, a section having a central channel therein, a plate arranged above the section, another plate arranged above the last named plate, means for securing the plates and the continuous section to each other and means resting in the channel and secured to one of the plates.

2. In a belt, the combination of a continuous section of material, a channel formed in one portion of the material near its meeting ends, a plate adapted to rest on the material and over the meeting ends thereof, a second plate arranged below the material at the meeting ends thereof, bolts for securing the plates to each other, studs extending from one to the other of the plates and reinforcing means secured to the studs and resting in the channel of the material.

In testimony whereof I have hereunto set my hand in presence of two subscribing witnesses.

ALBERT HENNIGAN.

Witnesses:
 LEON F. BENDIX,
 HENRY G. FRICKE.